G. F. GEB.
VEHICLE WHEEL.
APPLICATION FILED FEB. 10, 1913.
1,091,503.
Patented Mar. 31, 1914.
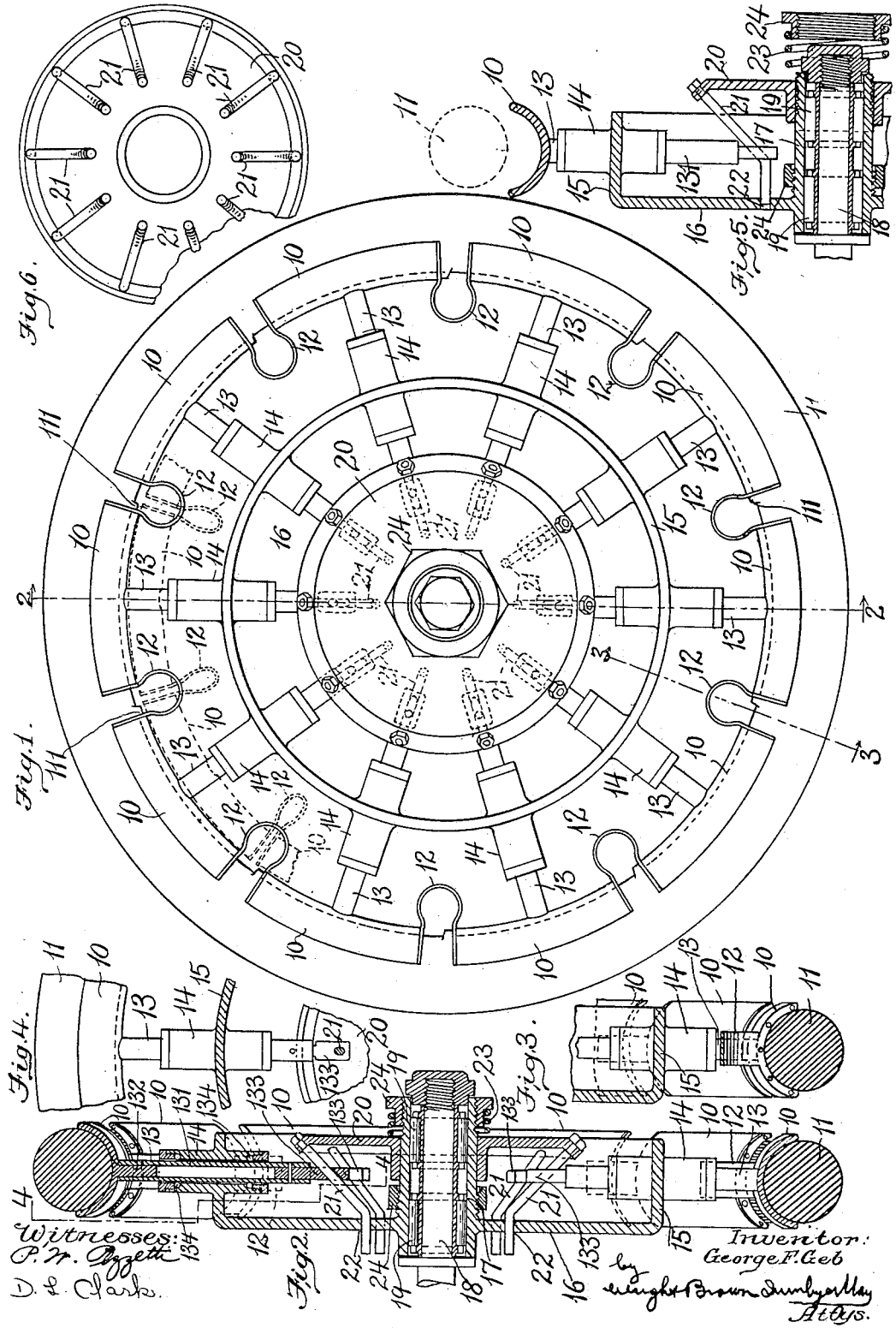

UNITED STATES PATENT OFFICE.

GEORGE F. GEB, OF FRANKLIN, MASSACHUSETTS.

VEHICLE-WHEEL.

1,091,503.

Specification of Letters Patent.   Patented Mar. 31, 1914.

Application filed February 10, 1913.   Serial No. 747,228.

*To all whom it may concern:*

Be it known that I, GEORGE F. GEB, a citizen of the United States, and a resident of Franklin, in the county of Norfolk and State of Massachusetts, have invented certain new and useful Improvements in Vehicle-Wheels, of which the following is a specification.

This invention has relation to vehicle wheels of the resilient type, the object of the invention being to provide a wheel in which the cushion is located between the tire and the axle, in such manner that the shock is distributed throughout the wheel.

On the accompanying drawings, Figure 1 represents a side elevation of a wheel embodying the invention. Fig. 2 represents a section through the same on the line 2—2 of Fig. 1. Fig. 3 represents a section on the line 3—3 of Fig. 1. Fig. 4 represents a section on the line 4—4 of Fig. 2. Fig. 5 represents a section through the wheel and illustrates the spokes and rim segments drawn inwardly for the attachment of the tire. Fig. 6 shows a detail view of the cone member.

Referring to the drawings,—the rim of the wheel consists of a series of segments 10 which are illustrated as concavo-convex in section so that when assembled they receive and support a tire as indicated at 11. Preferably the tire is of the solid cushion type and is preferably endless. Between the adjacent ends of the segments, there are interposed leaf springs 12, which in side elevation are approximately U-shaped with the bends projecting radially inward. The ends of these springs are bifurcated as illustrated in Fig. 3, and the bifurcated portions are affixed to the ends of the segments. As a result of this construction, tension of the springs against the segments tends to expand the rim as a whole. Each segment of the rim is formed with or is rigidly secured to a spoke as indicated at 13. These spokes are arranged in slide bearings 14 formed on the flanged rim 15 of a hub 16. The hub 16 has itself a hub 17 to receive an axle 18, and between the axle and the hub there are suitable anti-friction bearings such as roller bearings indicated at 19.

The spokes 13 are capable of sliding radially in their bearings 14. The spokes may be formed in any suitable way. As illustrated, they comprise a tubular sleeve section 131 and end sections telescoping therein as indicated at 132 and 133, the former being formed on or secured to a rim segment. Preferably the slide bearings 14 are provided with anti-friction devices such as series of balls indicated at 134 134. The inner ends of the spokes are engaged with a cone which is wedged longitudinally of the axis of the wheel by the radially inward movement of any one of the spokes. This cone is illustrated as comprising a disk 20 mounted to slide upon the hub proper 17 of the hub structure 16. It is provided with a series of steel rods 21, one for each spoke. These rods are secured in any suitable way to the marginal edge of the disk and each is at an angle of 45° to its coöperating spoke. Thus the free ends of the rods are all convergent toward a common point, although as illustrated the end portions of the rods are bent to lie parallel to the axis of the wheel and are passed through guiding apertures 22 in the hub structure 16. Thus both ends of each rod are supported and held from displacement radially of the wheel. The inner member 133 of each spoke is provided with an inclined aperture to receive the rod, as clearly shown in Fig. 2. In consequence of this construction, it will be observed that an axial movement of the sectional cone thus formed will cause a simultaneous radial movement of all of the spokes.

The cone is constantly subjected to the pressure of a spring, which in the present instance consists of a helix 23 located between one face of the disk 20 and an adjustable nut 24 which is screwed upon the hub 17. The pressure of the spring constantly tends to move the cone to the left so as to force the spokes and their attached segments radially outward to expand the wheel. One or more stops suitably located may be utilized to limit the extent of outward radial movement of the spokes and segments.

At 24 I have shown an adjustable collar with which the end of the hub of the disk 20 may engage to limit the movement of the cone and thereby limit the outward movement of the spokes and their attached segments.

From the foregoing description, it will be apparent that, when in operation the tire reaches a projection from the ground, the immediately adjacent spoke will be forced inward which will in turn wedge the cone against the tension of the spring 23 to the right, and that, by reason of the movement of the cone, all of the other spokes will be drawn or wedged inwardly to the same extent. Thus the shock will be taken up not only by the spring 23 but by all of the springs 12 which are interposed between the ends of the rim segments. As soon as the tire passes the obstruction, the tension of the springs last noted will cause the simultaneous expansion of the entire wheel to its normal condition. It will be noted that the rods 21 are, as I have stated, at an angle of 45° to the spokes, so that there is a true wedging action, first of the spokes upon the rods and then of the rods upon the spokes. When it is desired to place the tire upon the rim, the nut 24 may be removed and the cone drawn outwardly or to the right, the effect of which is to draw all of the spokes inward and so reduce the diameter of the wheel, as shown in Fig. 5, that the tire may be easily placed in the rim, and then, by forcing the cone inward or to the left, the spokes may all be moved outward so that the rim segments will properly engage the tire. To prevent the crawling of the tire on the rim, the tire may be provided with a series of projections as indicated at 111 to engage the ends of the segments. In the wheel which I have described, the spokes are forced outwardly by the pressure of the spring 23, and the action of the spring is supplemented and aided by the action of the springs 12. I have provided a rim which consists of a series of rigid or non-resilient sections with interposed yielding or resilient sections; the non-resilient sections are guided radially by their attached spokes; and each spoke is forced yieldingly outward by the spring 23 between which and the ends of the spokes there is a wedge.

Having thus explained the nature of my said invention and described a way of constructing and using the same, although without attempting to set forth all of the forms in which it may be made or all of the modes of its use, what I claim is:

1. A vehicle wheel comprising a rim consisting of a series of non-resilient segments and metallic resilient members interposed between said segments, radially movable spokes connected to said non-resilient sections, an axially movable cone engaged with said spokes, and means exerting yielding pressure on said cone to move it axially and thereby force said spokes radially outward.

2. A vehicle wheel comprising a rim consisting of a series of non-resilient segments and curved spring members interposed between said segments and having their ends secured thereto, in combination with radially movable spokes connected to said segments, an axially movable cone engaged with said spokes, and yielding means bearing against said cone and tending to move it axially.

3. A vehicle wheel comprising a series of non-resilient segments and U-shaped spring members interposed between said segments and having their ends secured to said segments, radially movable spokes connected to said segments, a hub with which said spokes are in sliding engagement, and a spring-tensioned cone exerting upward pressure against the inner ends of all of said spokes.

4. A vehicle wheel comprising a continuous rim consisting of alternating non-resilient segments and U-shaped spring members, the ends of the spring members being secured to the adjacent segments, a hub having radial guideways, radially movable spokes connected to the segments and arranged to move in the guideways in the hub radially of said hub, and means common to all of said spokes and tending to yieldingly force said spokes radially outward, substantially as set forth.

5. A vehicle wheel comprising an expansible rim, radially movable spokes connected thereto, an axially movable cone engaged with said spokes, and means exerting yielding pressure on said cone to move it axially and thereby to force said spokes radially outward.

6. A vehicle wheel comprising an expansible rim, radially movable spokes connected thereto, a hub having a flanged rim with slide bearings for said spokes, a cone freely sliding on the hub and engaged with said spokes, and stops for limiting the sliding movement of the cone.

7. A vehicle wheel comprising an expansible rim, radially movable spokes connected thereto, and an axially movable cone having converging rods slidingly engaged with said spokes to move them positively inward or outward, said cone being axially moved by the inward movement of any of said spokes.

8. A vehicle wheel comprising an expansible rim, radially movable spokes connected thereto, an axially movable cone having converging rods slidingly engaged with said spokes to move them positively inward or outward, said cone being axially moved by the inward movement of any of said spokes, and a spring for yieldingly holding said cone against movement.

9. A vehicle wheel comprising a hub, a plurality of radially movable spokes, and a spring-tensioned cone exerting outward pressure against the inner ends of all of said spokes.

10. A vehicle wheel comprising an expanding rim consisting of alternate non-resilient and U-shape spring sections, a hub, a plurality of spokes slidable in the hub and connected to the non-resilient sections of the rim, and yielding means common to all of said spokes for forcing said spokes radially outward.

11. A vehicle wheel comprising an expanding rim consisting of alternate resilient and non-resilient sections, a hub, a plurality of spokes slidable in the hub and connected to the non-resilient sections of the rim, a member slidable on the hub and having converging rods passed through apertures in the spokes to wedge and be wedged by said spokes, and a spring bearing against said member.

In testimony whereof I have affixed my signature, in presence of two witnesses.

GEORGE F. GEB.

Witnesses:
MARCUS B. MAY,
P. W. PEZZETTI.

Copies of this patent may be obtained for five cents each, by addressing the "Commissioner of Patents, Washington, D. C."